United States Patent
Rümmer

[11] Patent Number: 5,145,529
[45] Date of Patent: Sep. 8, 1992

[54] SYSTEM FOR COATING STRIPS OF BACKING

[76] Inventor: Jürgen Rümmer, 8, Industriestr., D-8609 Bischberg, Fed. Rep. of Germany

[21] Appl. No.: 600,408

[22] Filed: Oct. 19, 1990

[30] Foreign Application Priority Data

Oct. 20, 1989 [DE] Fed. Rep. of Germany ....... 3935059

[51] Int. Cl.$^5$ ............................................. B05C 3/02
[52] U.S. Cl. ..................................... 118/413; 118/60; 118/69; 118/67; 118/126; 118/308; 118/312; 118/412; 118/415
[58] Field of Search ...................... 118/673, 60, 67, 68, 118/69, 101, 119, 123, 126, 308, 312, 325, 412, 413, 415; 209/255, 257

[56] References Cited

U.S. PATENT DOCUMENTS

| | | | |
|---|---|---|---|
| 2,054,115 | 9/1936 | Abrams | 118/69 |
| 2,249,088 | 7/1941 | Murray | 118/101 |
| 2,649,758 | 8/1953 | Cowgill | 118/603 |
| 2,678,284 | 5/1954 | Holt | 118/69 |
| 2,839,025 | 6/1958 | Burke | 118/413 |
| 2,905,569 | 9/1959 | Zitke | 118/308 |
| 2,992,627 | 7/1961 | Ring | 118/413 |
| 3,079,889 | 3/1963 | Jacobs et al. | 118/421 |
| 3,797,453 | 3/1974 | Rizzo | 118/69 |
| 3,848,439 | 11/1974 | Lopata | 118/421 |
| 4,233,011 | 11/1980 | Bolender et al. | 29/116.2 |
| 4,277,518 | 7/1981 | Schillke et al. | 118/69 |
| 4,626,452 | 12/1986 | Poterala | 118/413 |
| 4,796,525 | 1/1989 | Schiel | 29/116.2 |

FOREIGN PATENT DOCUMENTS

| | | | |
|---|---|---|---|
| 2722595 | 11/1978 | Fed. Rep. of Germany | 118/413 |
| 2085200 | 4/1982 | United Kingdom | 118/673 |

Primary Examiner—W. Gary Jones
Assistant Examiner—Brenda Lamb
Attorney, Agent, or Firm—Max Fogiel

[57] ABSTRACT

A system for applying one or more coats to the top and/or bottom of strips of backing and for manufacturing strip without any strips of backing. The system is has a water-cooled belt (17), at least one separate coater (9, 22, 23, and 35) for the upper and lower surfaces, separate sprinklers (12 and 25) for sprinkling the coated upper and lower surfaces of the strips of backing, featuring suction devices (13 and 26) for suctioning up any dust from the water-cooled belt and at least one additional coater (42) and water-cooled roller (67) is provided for coating strips of backing or for manufacturing a strip without the strips of backing.

27 Claims, 11 Drawing Sheets

SYSTEM FOR COATING STRIPS OF BACKING

BACKGROUND OF THE INVENTION

The invention concerns a system for applying one or more coats to the top and/or bottom of strips of backing and for manufacturing strip without any backing with, or from, one or more such materials as asphalt, possibly sprinkled with such a material as granulated slate, silica sand, talc, etc. and optionally covered with sheeting or a similar material.

Strips of coated backing are needed in a very wide range of technical applications. There is an urgent demand for example for strips of roofing material coated with asphalt, and a version that is substantially easier to apply because it has a layer of adhesive activated just before the strips are laid is being used more and more often. Since neither their plastic base nor their asphalt coat is resistant to ultraviolet light, the asphalt on the upper surface of these strips is sprinkled with such a material as granulated slate to protect it from the sun. In addition to roofing, there are many other applications for coated material—as insulation for buildings and vehicle bodies for example.

Coating such strips while they are still raw or once they have been impregnated by soaking in dilute asphalt an while they are spread out horizontal (or formerly suspended vertical) is known. Asphalt is applied to the base in excess either from below with a roller or from above and below by immersion and then stripped off to the desired thickness with two calibrating rollers. Systems in which appropriate volumes of asphalt are introduced from above and applied to the top of the base are also known. The excess escapes into a heated trough. The base is drawn along horizontally while a roller scoops asphalt onto it from below. The excess asphalt flows over an adjustable-height weir and is pumped back into an associated agitator. Since known devices employ large pans with a capacity of approximately 1000 l, a lot of material is lost when it is replaced with a different material, and a lot of energy is consumed in heating the pan. Large pumps are needed to recirculate the excess, which is of course also considerable.

Another drawback of the known systems and device is that, since the intermediate layer cannot be precisely controlled, the amount of asphalt to be applied to the upper and lower surface cannot be precisely dictated. It is impossible to measure the product, to determine the thickness of the final product, that is, immediately after coating because it is not supported in that vicinity but hangs free. The base "floats" to a certain extent between the top and bottom coats, and it is impossible to precisely define the distance up and down. The lack of support, especially once the particles have been sprinkled onto the upper surface, results in severe sagging that generates substantial stress that in turn leads to shrinkage, especially of thermoplastic bases. Since it is impossible to measure how thick the product is immediately after the coats have been applied to the base, it will be just as impossible to carry out any corrections at that point, and the quality of the product suffers. Raw materials are lost. Too thick a coat entails a loss to the manufacturer and too thin a coat results in rejection.

The product can admittedly be provided with better surface properties in known drawing devices, although the aforesaid drawbacks are still present. Another drawback of the known device is that substantial blistering always occurs when sheet is bonded to the upper or lower surface because the sheet bonds immediately and uncontrolled, capturing air that produces the blisters. The sheet must be relatively thick in that the coatings are modified and include fillers, so that they must be processed at approximately 160° to 180° C., temperatures at which a thin sheet would melt very rapidly. The result is malfunctions due to the hot asphalt clogging up the conventional machinery. Again, multiple coating in particular is difficult and poorly controlled because it requires a series of the aforesaid large pans. The asphalt must be applied to the upper surface of the base in a considerable excess in known systems. Some of the surface of the asphalt will accordingly cool, leading to areas of different temperature inside the laminator that have a negative effect on the coat's uniformity. Surface properties sometimes suffer, and the extent that the sprinkling material adheres to will vary, causing streaks. Again, the rollers will pick up the hot asphalt after the calibration process, independently from the aspect of fluid mechanics of whether they are stationary or rotating in opposite senses, which can again apply stress to the base. The excess sprinkling material is recycled in known systems by vibrating conveyors and screws or belts that convey it to the side and by elevators that raise it and return it to its hopper. These mechanisms involve considerable engineering expenditure and take up a lot of space. Since the sprinkling material ls very abrasive, the components that handle it wear out rapidly. The known systems accordingly have substantial drawbacks that impede the manufacture and coating of high-quality strip bases.

Furthermore, since the known systems are very complicated to operate, the quality of the products extensively depends on the skill and knowledge of the particular operators. The manufacturing range of the state-of-the-art systems is also very restricted. The limitations of the current methods appear very rapidly when heat-unstable base materials are employed.

Typical of another known system is that the surface remains too tacky the asphalt adheres to the rollers. Although the sheet must travel along in this system, it represents nothing but waste. At lower temperatures the coat exerts powerful stresses, which leads again to poor surfaces. The surface is sprinkled with sand, and the excess is not removed.

SUMMARY OF THE INVENTION

The object of the present invention is to improve a system or device of the type recited in the preamble to claim 1 to the extent that a multiplicity of structurally different higher-quality strips can be manufactured. The system is intended to be extensively automated and operator-friendly. The thickness of the coats applied to the base is to be precisely adjustable and definable and capable of correction at any time. The system is to be simple in structure and easy to convert for different products. The drawbacks associated with the aforesaid systems are to be eliminated.

The system will make it possible not only to coat bases but also to manufacture products of any thickness without any base at all.

The coating system has a water-cooled belt, at least one coater for the upper surface and at least another for the lower surface, sprinklers for the upper surface and the lower surface accompanied by suction, and finally another coater for coating sheet and for making strips with a base. A wide range of variously coated products can be manufactured in the system. Since only weak forces are exerted on the base while it is being coated with the asphalt, for example, it will remain free of tension. The coaters have a heated coating-application box with side walls that ca be shifted transversely to match it precisely to the width of the strip being coated. The coaters are also provided with heated doctors that can be interchanged depending on the type of coating. The rear wall of the coating-application box is also adjustable, making it possible to vary the coating gap as necessary. The heated boxes and doctor keep the coating uniformly hot over the total width. Several coaters can be aligned and apply several coats to the base in succession. The doctors produce very satisfactory and smooth surfaces even with modified coatings with up to 30% filler. The thickness of the coat can be varied simply by raising and lowering the coater. The sheet coater has a well cooled roller with a hollow surface, and the asphalt coating will harden very rapidly in the narrow area where it comes into contact with the roller, separating from the surface of the roller very satisfactorily. The cooling for the water-cooled belt is simultaneously discontinued in the vicinity of this coater, raising the temperature of the bottom of the belt and ensuring that the asphalt will adhere tightly to the belt, be carried along, and cool off and separate only once it arrives at the water-cooled section. Since the water-cooled roller can also be raised and lowered, an asphalt product of very high quality and any thickness can be manufactured without a base. The water-cooled belt, which is made of steel, is suspended from arms and can easily be replaced. One advantageous embodiment of the system has in addition to sprinklers for the top and bottom a device for sprinkling the edges, also accompanied by suction. The system allows the coatings to be supplied at temperatures ranging from 150° to 160° C., whereas known systems operate at a range of 180° to 190° C. The low temperatures result in much less thermal stress. The output of the system can be increased in that the coatings are cooled even while they are in the agitators and not just by the system cooling. The high cooling output of the water-cooled roller keeps the sheet strong even when the coatings are hotter. The system also has either another water-cooled belt downstream or additional water-cooled rollers. The sprinklers have sieves that can be adjusted for coarse and fine sprinkles and guides for aligning flaky sprinkles. The coater, with a heated roller that can be raised and lowered, allow many types of coating with and without sheet and with optimal surface properties.

BRIEF DESCRIPTION OF THE DRAWINGS

The invention will now be described in detail with reference to the drawings, wherein.

DESCRIPTION OF THE PREFERRED EMBODIMENTS

Figure 1:
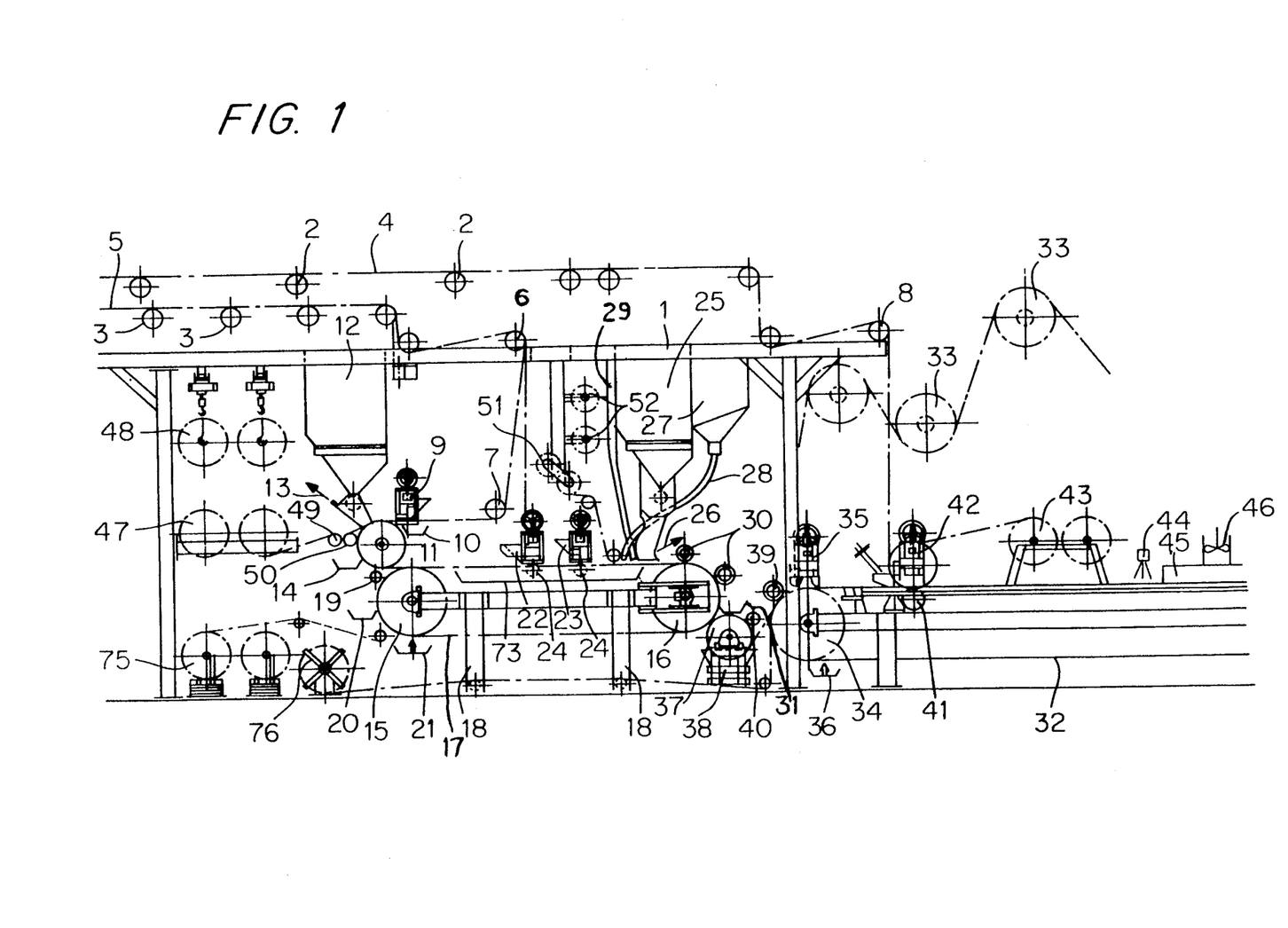
FIG. 1 is a schematic side view of the system.
Figure 2:
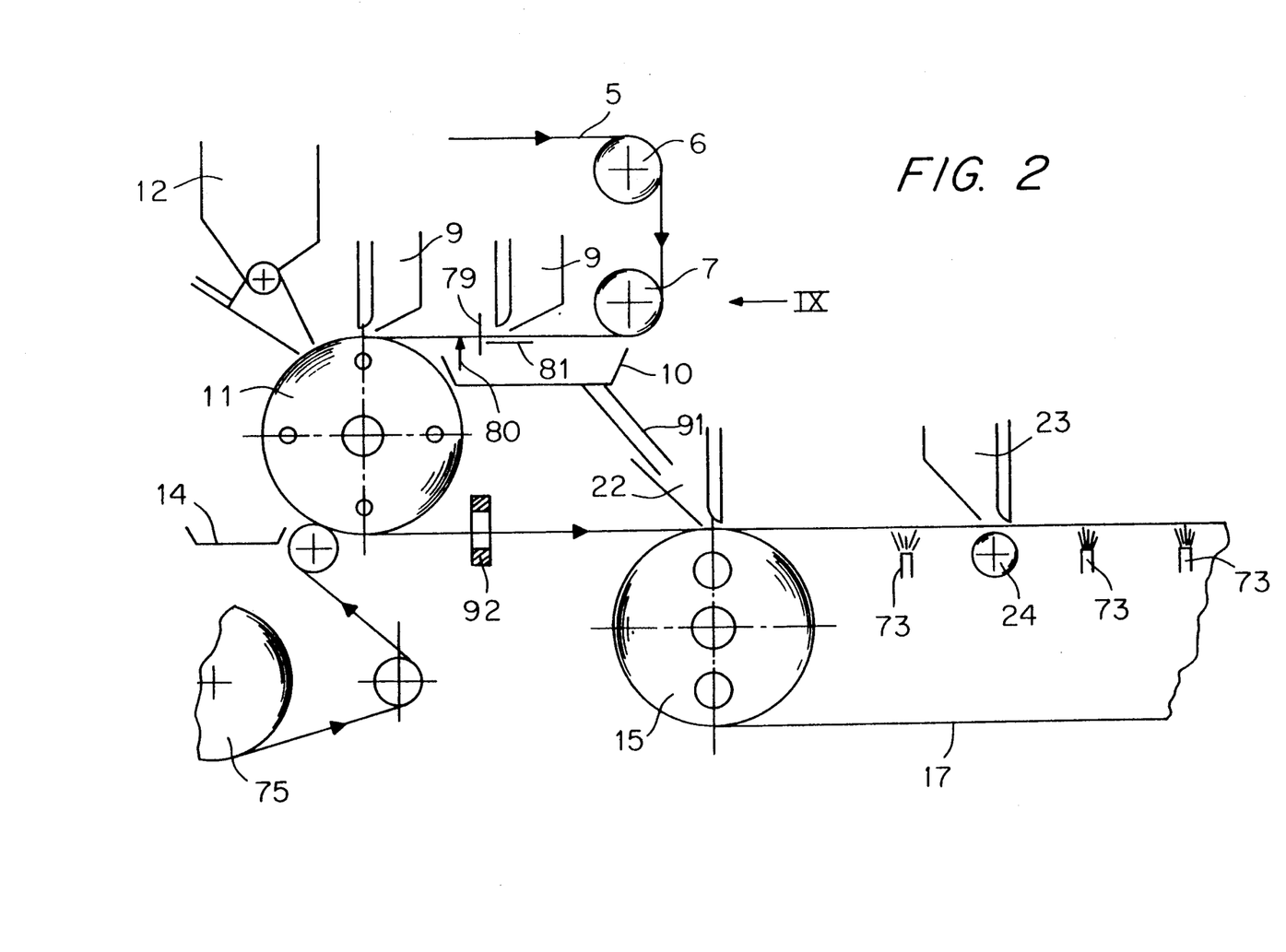
FIG. 2 is a larger-scale simplified side view of part of the system.
Figure 9:
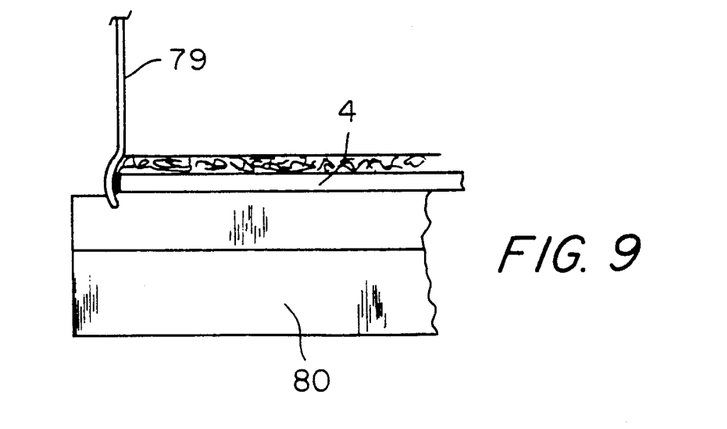
FIG. 9 is a larger-scale schematic view along the direction represented by arrow IX in FIG. 2.

The system or device for multiply coating strips of base and for manufacturing strip without a base schematically illustrated in FIG. 1 consists of a frame 1 positioned below heated or unheated active rollers 2 and 3 that forward two strips 4 and 5 of material extracted from an unillustrated reel or arriving from an also unillustrated impregnating bath. Positioners 6, 7, and 8 monitor the edge of the strip with light-sensitive, mechanical, or pneumatic sensors and align it when necessary, maintaining precise travel. The lower surface of the strip is coated by at least one coater 9 with a number of layers. Coater 9 and its supporting surface 81 will be described in greater detail hereinafter with reference to FIGS. 4, 5, and 6. FIG. 2 by the way schematic illustrates two such coaters in series. Associated with coater 9 is a heated tub 10 that intercepts excess coating as it flows over the edges of the strip. As will be evident from FIG. 9 in particular in fact, since the coating is applied in excess, it will flow along the margins and edges of strips 4 and 5 and cover them completely. Curved lateral edge scrapers 79 remove excess coating and smooth out the margins. A blade 80 smoothes out the lower surface of the base.

The system has a heated deflection roller 11 that can also have a stripping device. Above deflection roller 11 is a container or hopper 12 for the lower-surface sprinkles. It may be associated with a dust vacuum 13. Excess lower-surface sprinkles are intercepted by a tub 14 and returned to hopper 12. Also apparent in FIG. 2 is a sensor 92 that detects and measures the position of the edges of the strip.

The system has a water-cooled welded-steel belt 17 that travels around rollers 15 and 16 and is cantilevered out and accordingly free-bearing. Belt 17 is secured by arms 18 and can accordingly be rapidly replaced. It is cooled by water from a cooler 73 in the form of nozzles, a tub, etc. (cf. also FIGS. 2 and 3).

Figure 10:
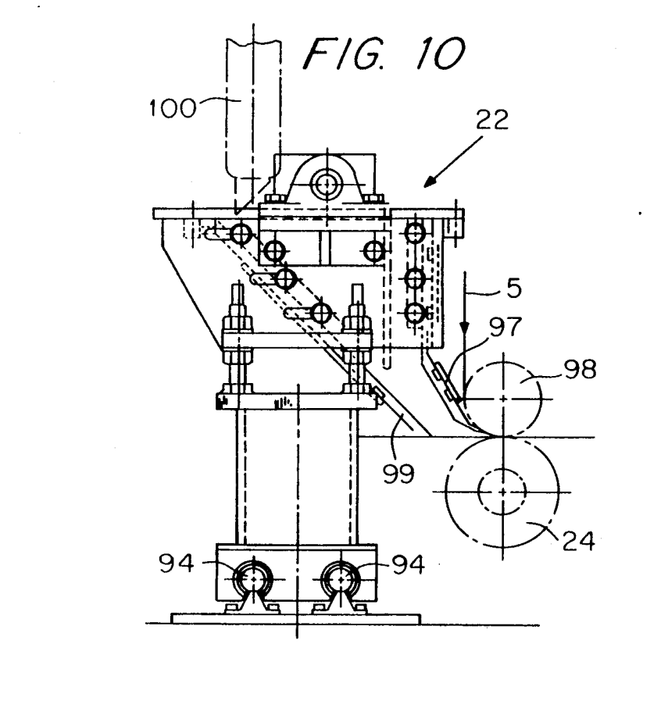
FIG. 10 is a side view of a coater with a heated roller.
Figure 11:
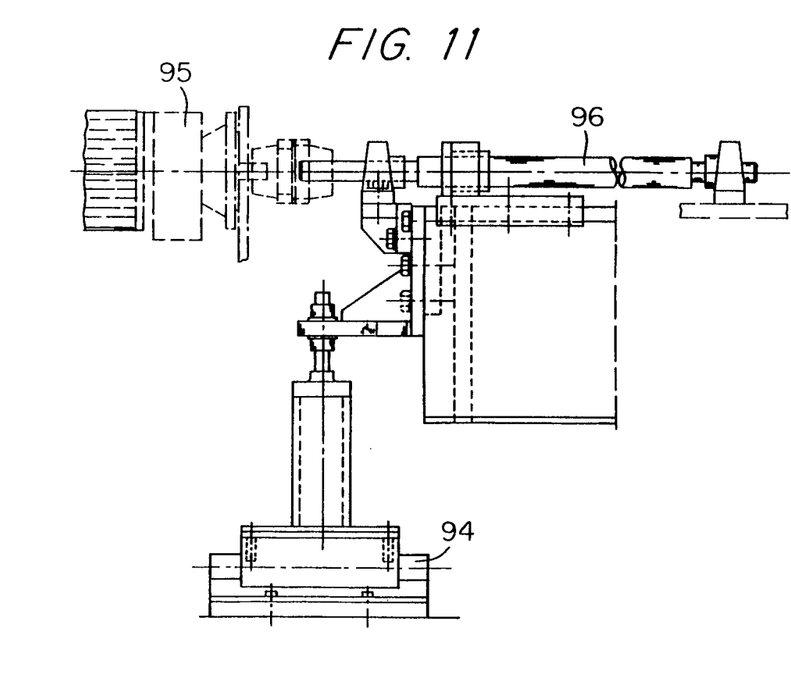
FIG. 11 is a front view of the device illustrated in FIG. 10.

Directly above water-cooled belt 17 are two additional coaters 22 and 23 that coat the upper surface of the strip. Coater 23 is essentially identical with lower-surface coater 9, which will be described with reference to FIGS. 4, 5, and 6, whereas the structure of coater 22 is illustrated in FIGS. 10 and 11. Below each coater 22 and 23 and inside water-cooled belt 17 is a backing roller 24. When the two coats are of the same material, the excess stripped off from the strip and intercepted in heated tub 10 is supplied directly to coater 22. For this purpose there is a connecting line 91 (FIG. 2) between heated tub 10 and coater 22. Downstream of coaters 22 and 23 (and additional coaters may be added for applying additional coats) is a container 25 for the main and upper-surface sprinkles with a device 26 for suctioning up any dust that may occur. This device is followed by another container 27 for sprinkling the edges. This container is provided with a supply line 28 or with one supply line 28 for each edge. Downstream of supply line 28 is a vacuum device 29 for suctioning up excess edge sprinkles. It prevents the sprinkles from mixing up. Two rubberized compression rollers 30 force the sprinkles into the coat, and a recycler 31 returns excess sprinkles to container 25, completely preventing waste. There can also be a cyclone downstream of the suctioning and recycling devices to separate sprinkles from dust. The dust can then be removed for use as a filler in the asphalt mixer. The suction completely cleans out the whole system, which can be converted for use with other materials, red sprinkles instead of green for example, without mixing them together. This approach decreases rejects.

The system is equipped with another steel belt 32 cooled with water sprayed from nozzles downstream of belt 17. A series 33 of water-cooled rollers like those represented by the dot-and-dash lines in FIG. 1 can be employed instead of belt 32. Above a roller 34 that belt 32 travels around is a coater 35 that is essentially identical to the aforesaid coaters. Below roller 34 is a spray head 36 that is similar to spray head 21 and that sprays a releasing agent onto the surface of belt 32. Between belts 17 and coater 32, a deflection roller 37 is immersed in a water bath 38 that can be raised and lowered to moisten and cool uncoated product surfaces. When a strip is being sprinkled or laminated with sheet, water bath 38 is lowered and deflection roller 37 travels above it. A rubberized compression roller 39 upstream of coater 35 presses against the roller 34 associated with belt 32. A rotating helical brush 40 in the vicinity of deflection roller 37 removes any excess sprinkles.

Downstream of coater 35, which is intended for additional and different coatings, another coater 42, which can also be called an asphalt-sheet extruder, is positioned above a backing roller 41. The design of this device, which can be employed either to manufacture strip without bases or to coat sheets or strip, will be particularly evident from FIG. 7 and will be described in greater detail. Additional bases or strip can be extracted from an unroller 43. Belts 17 and 32 are provided with water-based cooling devices, specifically sprays, which will be described in greater detail hereinafter with reference to FIGS. 2 and 7. In addition to these coolant nozzles, there are other nozzles 44 to supply additional water outside belt 32. Also associated with belt 32 are traveling hoods 45 provided with fans 46 to extract steam.

Figure 3:
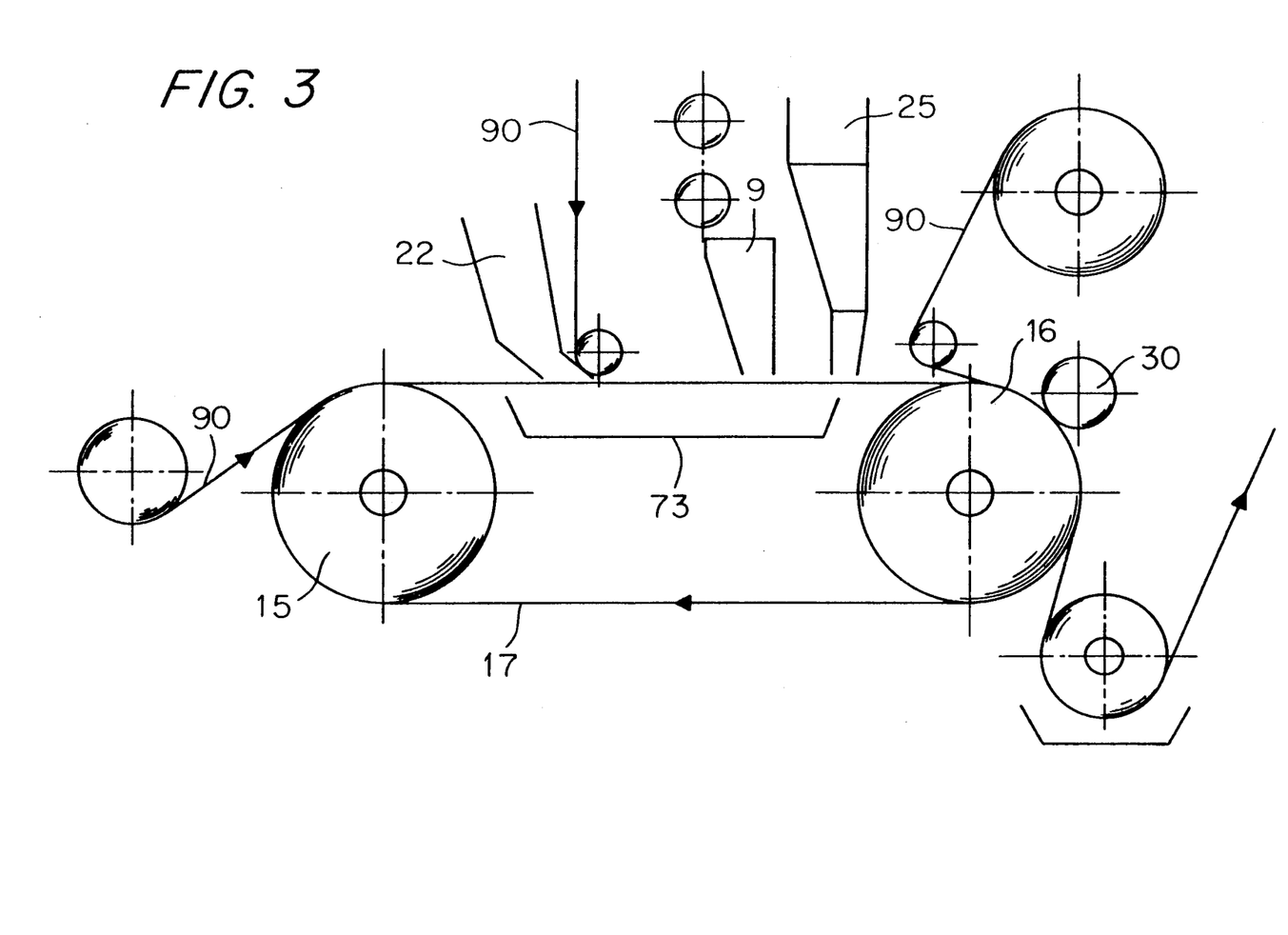
FIG. 3 is a simplified side view illustrating the basic principle of the system.

FIG. 3 is a simplified representation of the basic embodiment. Since the system is modular, it can always be expanded and refitted as necessary. The basic embodiment illustrated in FIG. 3 has a two coaters 9 and 22 followed by a sprinkler 25. Sheet 90 is supplied as necessary and desired for manufacturing products that are smooth on the top and/or bottom for example, that have sheet laminated to the top and/or bottom, that have particles sprinkled on their upper surface, etc.

To process additional strip or sheet there is in addition to the aforesaid unroller 43 an unrolling station 47 for siliconized roofing strip with removable replacement reels 48 positioned above it along with supply and deflection rollers 49 and 50, whereby rollers 49 are unheated and rollers 50 are heated, an unroller 51 for edging strip, and another unroller 52 for laminating sheet to a layer of hot asphalt.

Figure 4:
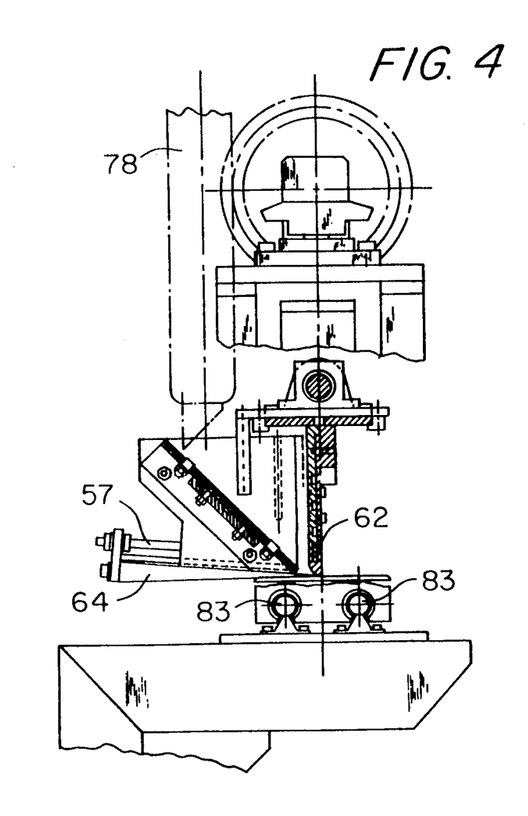
FIG. 4 is a larger-scale side view of the base coater.
Figure 5:
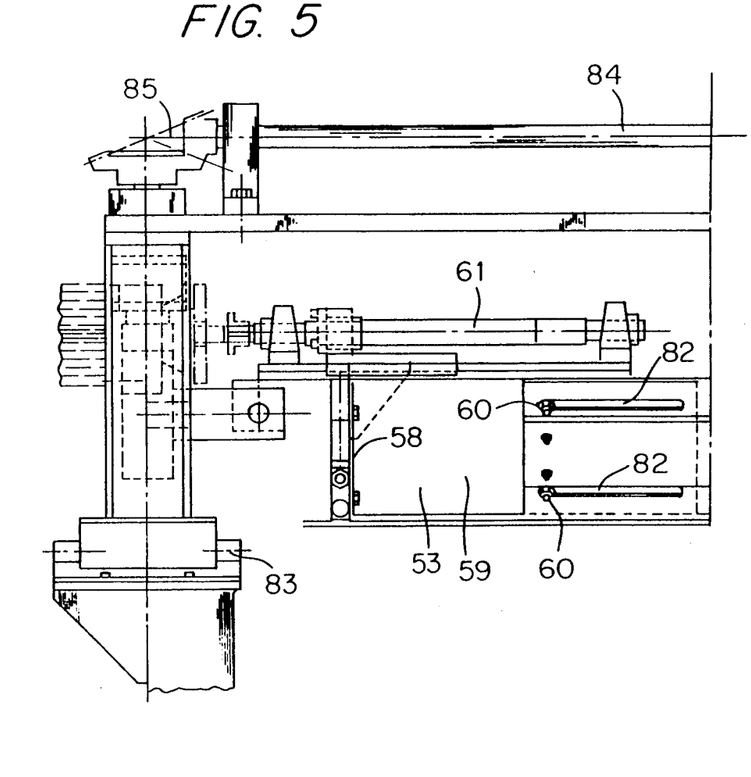
FIG. 5 is a rear view of the base coater illustrated in FIG. 4.
Figure 6:
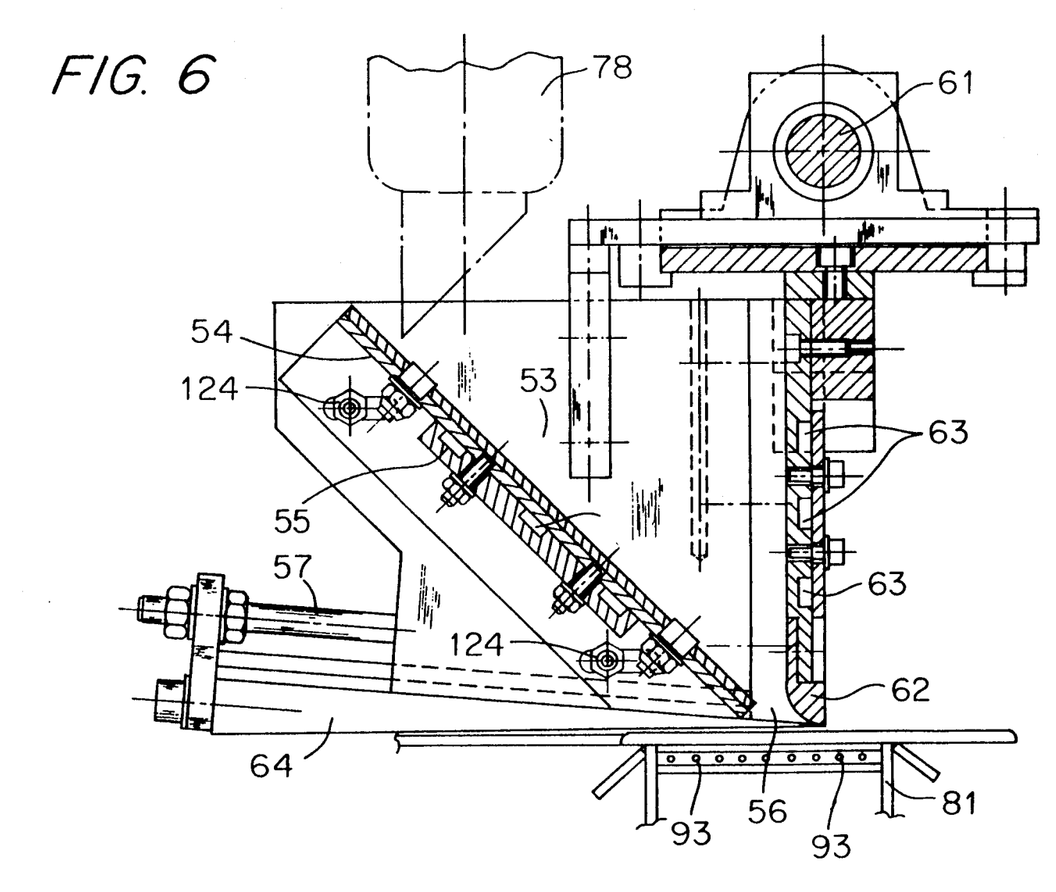
FIG. 6 is a larger-scale side view of the device illustrated in FIGS. 4 and 5.

The basic principle of coaters 9, 23, and 35 will be evident from FIGS. 4, 5, and 6. The coating device or station is equipped with an application box 53 for the coating that can be heated by heating elements 55 in its rear wall 54. It can also be heated with heating pads or hot oil. The width of a flow-control gap 56 can be varied to adapt to various coatings by securing rear wall 54 with screws and nets 124.

The length of flow-control gap 56 can also be adjusted to the width of the strip being coated. For this purpose the side walls 58 of application box 53 can be shifted laterally. Transverse walls 59 extending from each side wall 58 overlap and slide along one another, with screws with locknuts 60 engaging slots 82 in walls 59. Each side wall 58 is manually or by motor by way of a threaded spindle 61. Furthermore, the coater as a whole is mounted on transverse rails 83 on the machine frame and travels back and forth across the manufacturing line at an angle to the base depending on the established position of the base, as governed by spindle 84 and a beveled cogwheel 85. The coater also has a doctor 62 that can be replaced when necessary by another doctor on application box 53 and that can also be heated by internal heating elements 63. Application box 53 also has a sliding keel 64 that can be secured by a setscrew 57, that is made of plastic, and that has an antifriction surface of plastic, which allows a slight amount of slide when it comes into contact with the belt and simultaneously functions as a lateral seal or as an edge at that point. Coating is introduced into application box 53 by way of a line 78. The overall box can be raised and lowered to precisely vary the thickness of the coating on the base. An appropriate scale, an electrical ruler, etc. can be provided for this purpose, allowing precise establishment and adjustment of the position of the base. No other measurements of thickness are necessary. Since the product rests against the belt, it will not vibrate. The relative position of the base can be detected and corrected at any time. FIG. 6 also illustrates the position of supporting surface 81, which can be heated with an internal element 93, in relation to coater 9.

Figure 7:
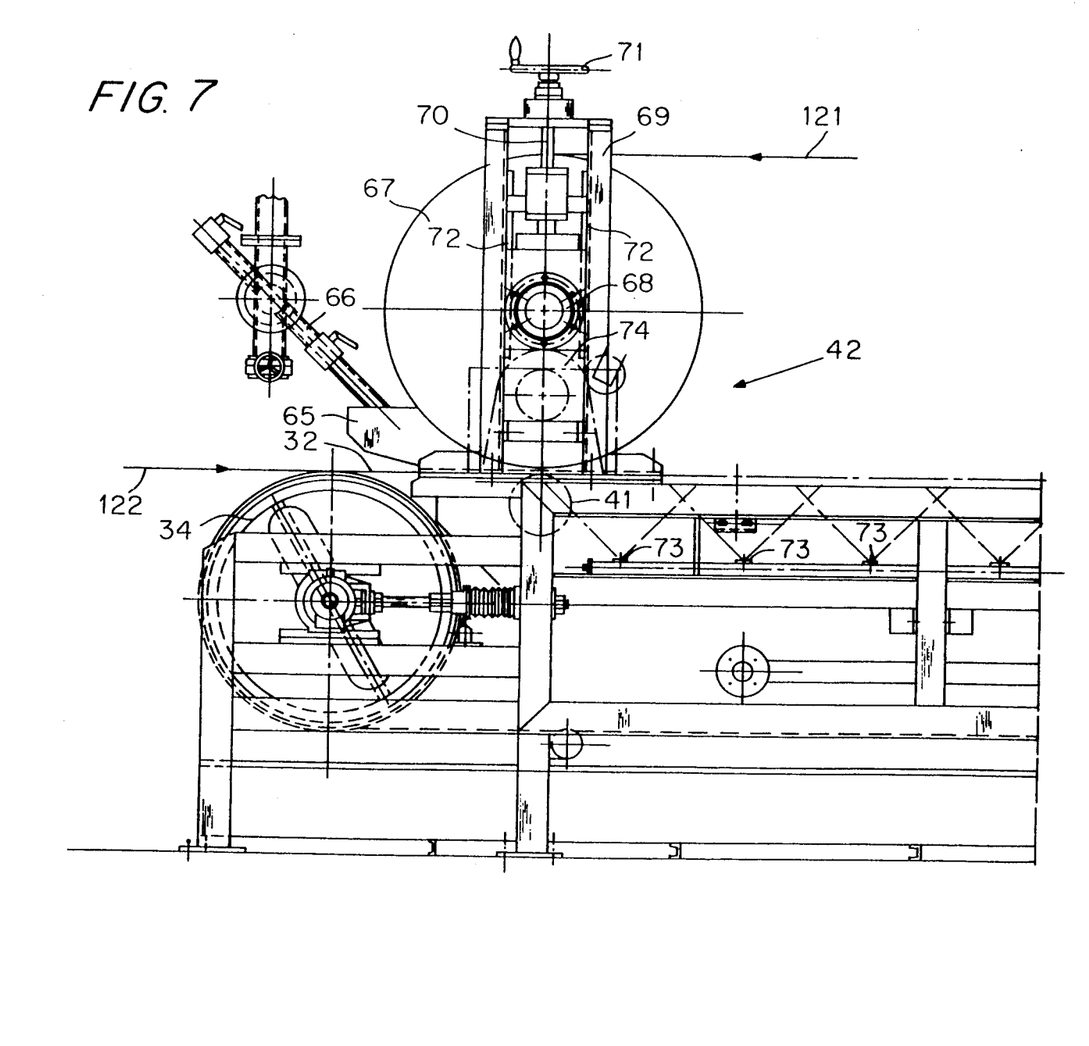
FIG. 7 is a side view of the device for coating sheet and manufacturing strips without a base.
Figure 12:
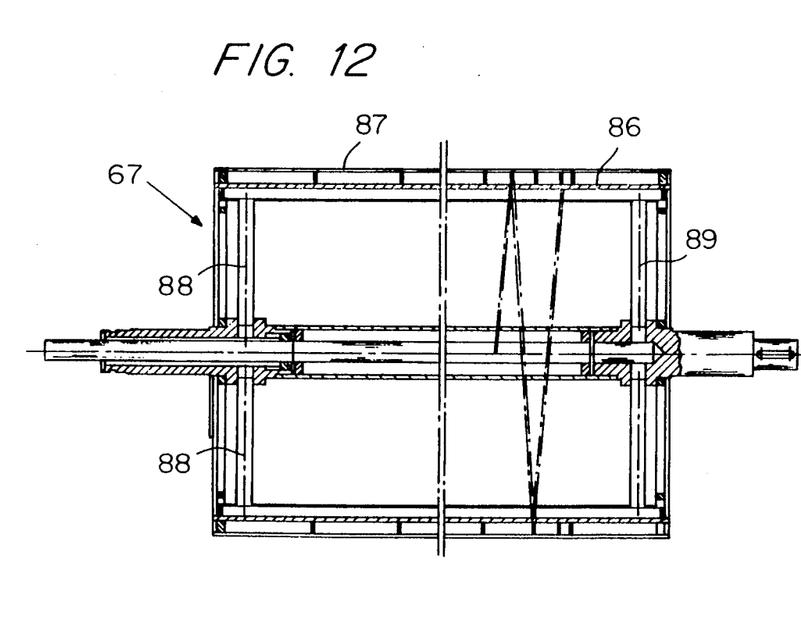
FIG. 12 is a longitudinal section through a double-walled water-cooled roller.
Figure 13:
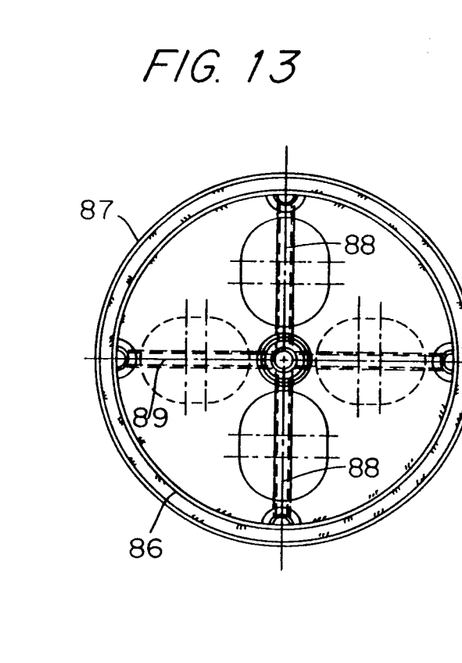
FIG. 13 is an end-on view of the water-cooled roller.

FIG. 7 is a detail of coater 42, which is employed to coat sheet and to manufacture strip of either asphalt or sulfur without a base. It can, however, also be employed to manufacture strips of chocolate. Coater 42 has a heated box 65 for applying a material that is supplied to it through a supply line 66. If the material is asphalt, it is heated to approximately 150° to 210° C. Box 65 also has side walls that travel back and forth transversely, precisely establishing the width of the gap. Coater 42 has a roller 67 with its surface or outer temperature reduced to approximately 5° C. It has double walls and is mourned in bearings 68 at each end. The overall water-cooled roller 67 can be raised and lowered by a device 69 that consists essentially of a spindle mechanism, a manual wheel 71 (or motor), and a guide 72. As will be evident from FIGS. 12 and 13, roller 67 consists essential of an inner wall 86 that accommodates the forces exerted on the roller and of an essentially thinner outer surface 87, ensuring effective cooling. The water flows through several sections between inner wall 86 and outer surface 87 from intakes 88 to outlets 89, distributing the temperature evenly over the length of roller 67. Coater 42 is positioned above belt 32 and has the aforesaid backing roller 41 to accommodate constant and temporary forces while also supporting belt 32. Positioned along the bottom of belt 32 are nozzles 72 that cool it by spraying water against its lower surface. Roller 67 is driven by a direct-current motor 74.

FIGS. 10 and 11 illustrate coater 22 which rests on transverse rails 94 and can be laterally displaced by a motor 95 and spindle 96 to adjust to the particular position of the base as detected by sensor 92. Another roller 98 upstream of a heated doctor 97 can be raised and lowered. The rear wall 99 of the application box can be adjusted to vary the width of the gap. Coating is supplied through an intake 100, which can handle similar materials, including excess from heated tub 10.

Figure 14:
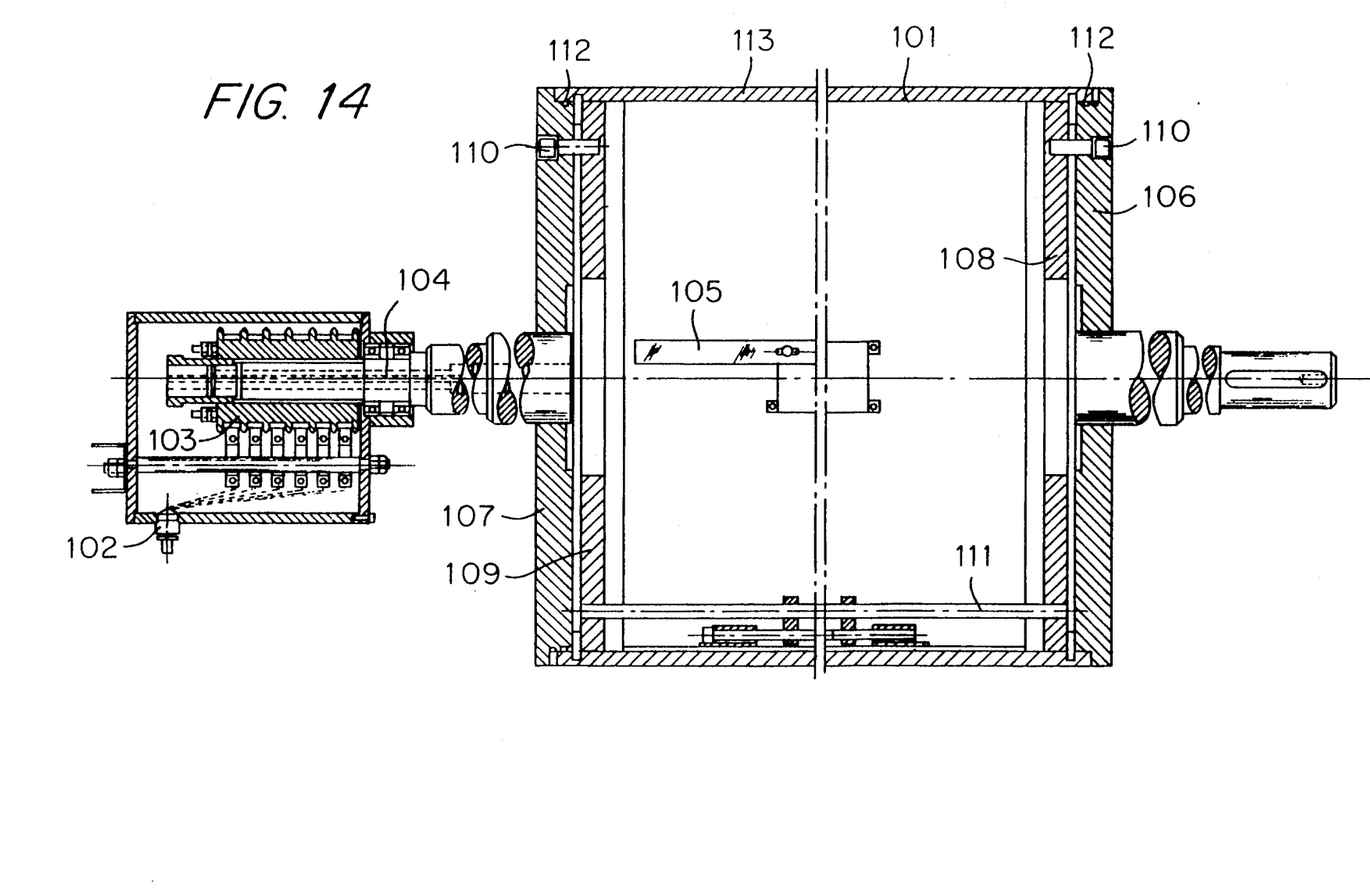
FIG. 14 is a longitudinal section through an electrically heated roller.

It will be evident that the system employs a series of heated rollers. These rollers can be heated electrically for example. An electrically heated roller is illustrated in larger scale in FIG. 14. Inside the roller is a heating pad 101 provide with electricity by way of a connection 102 and a friction ring 103 with a hollow shaft 104. A temperature sensor 105 maintains the desired temperature. Terminal disks 106 and 107 are fastened to securing disks 108 and 109 by screws 110, and either disks 108 and 109 or pad 101 are secured by an antirotation device 111. The roller is sealed off with seals 112 between disks 106 and 107 and outer surface 113.

Figure 15:
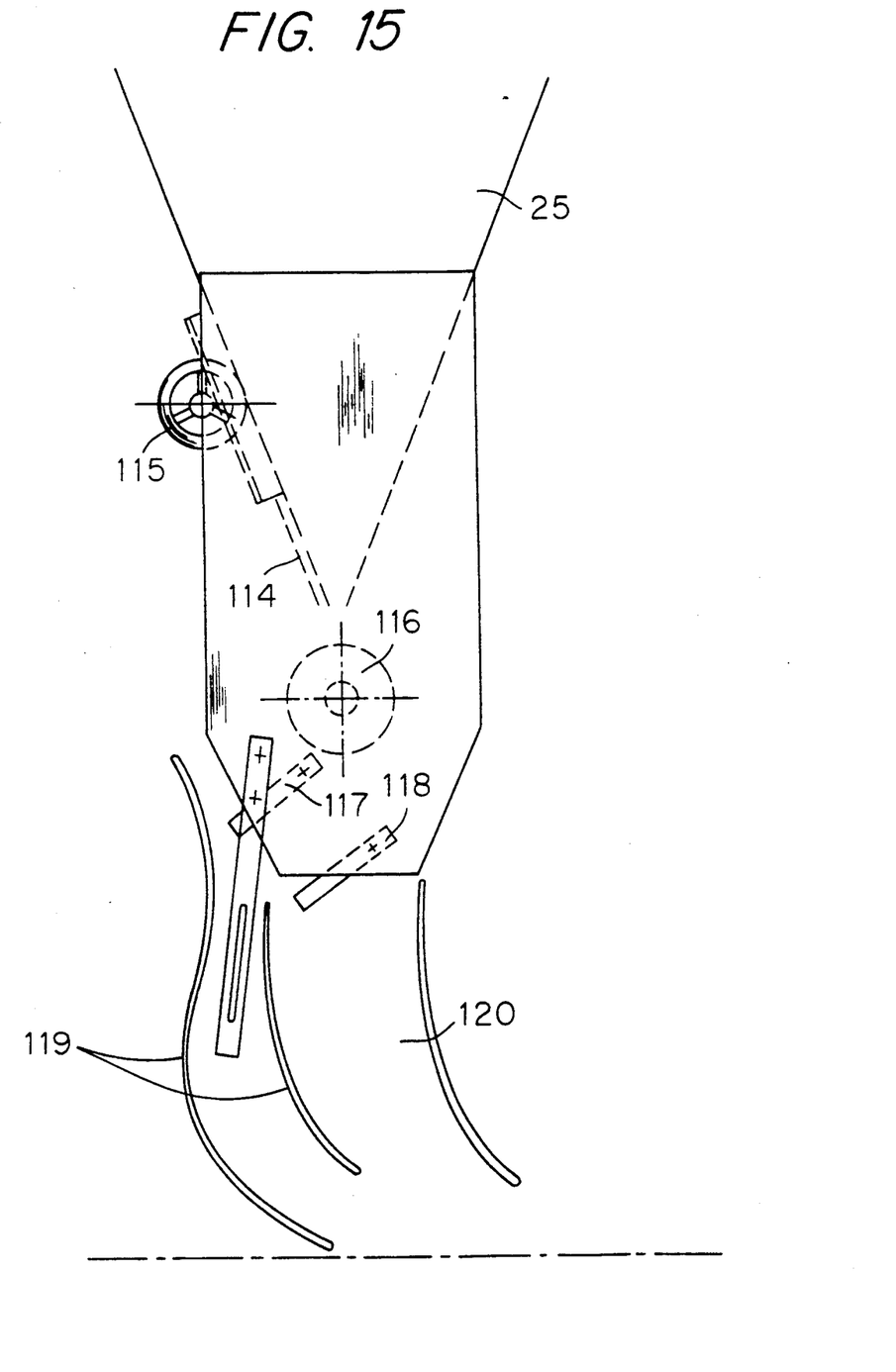
FIG. 15 is a schematic section through a main sprinkler.

FIG. 15, finally, schematic illustrates the sprinkler 25 that carries out the main sprinkling, with coarse, flaky, and fine particles. The wall 114 of the funnel can be displaced by way of wheel 115 to vary the outflow section of the funnel and hence the number of sprinkles emitted per unit of time. Positioned below sprinkling roller 116 are two adjustable-slope screens 117 and 118. Screen 117 sifts out coarser particles, which slide down along baffles 119, oriented such that the flaky components of the previously applied coating will arrive horizontally or somewhat tangentially and accordingly come to rest flat. The finer material, sifted again through screen 118, travels through a channel 120 onto the coating in accordance with size, and fills up any gaps in the sprinkles, ensuring a very satisfactory and dense distribution.

How the system operates when coating both the top and bottom of a base in the form of strip will now be briefly described with reference to FIGS. 1 and 2. Base 5 arrives by way of the various deflection rollers 3 and edge positioners 6 and 6 at lower-surface coater 9. The coating, asphalt for example, is applied to the desired thickness to base 5 and sprinkle by lower-surface sprinkler 12. Dust is suction away through dust vacuum 13. Several coatings can be applied by introducing additional coaters. Base 5, provided with its bottom coat, not travels to upper-surface coater 22. The edges are then sprinkled through supply lines 28 or sheet is supplied from device 52, excess material suctioned off by vacuum device 29, and the upper-surface sprinkles applied from sprinkler 25. Belt 17, which base 5 rests against while the upper surface is being applied, is cooled by nozzles 73. The sheet can also be supplied directly from deflection roller 6 to coater 22 as illustrated in FIG. 10. Also available for sheet or for addition base or edge sheeting are unrollers 75 and 76 The coating is obtained from reel 47 and added in excess especially when it adheres while cold to compensate for any shrinkage tensions that may occur later.

Figure 8:
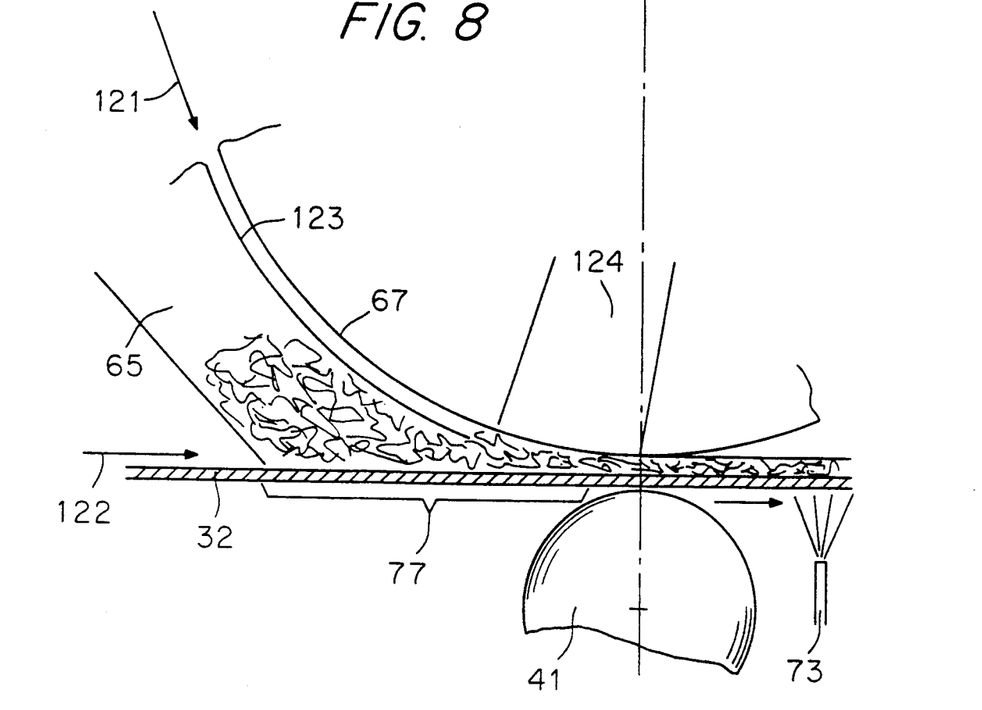
FIG. 8 is a larger-scale side view of part of the device for coating sheet and manufacturing strip without a base from liquids.

When producing without a base, the coating (asphalt, cf. FIG. 8 as well) arrives directly on belt 32 from the application box 65 in coater 42. In the contact are between the coating and the belt, the asphalt will initially adhere to belt 32, which is cooled very little if at all in that vicinity, and is entrained by the belt. Sheets 121 and 122 can also be supplied to the top and bottom. The rear wall 123 of application box 65 is equidistant from the surface of roller 67, preventing the roller from heating up in this area. It is only in the narrow contact area 124 where the coating comes into contact with roller 67 that a slight amount of heating occurs and the asphalt will separate without any difficulty from the low-temperature roller. It will also separate slightly from belt 32 in the area cooled by nozzles 73. The asphalt is applied to belt 32 in the form of a variable-width bead directly upstream of cooling roller 67, with the belt being slight moistened by the release agent.

I claim:

1. An arrangement for applying at least one layer of coating to strips of backing material or for producing strips without said strips backing material comprising: a water-cooled belt for carrying said strips of backing material to be coated, said strips of backing material having upper and lower surfaces at least one separate first coater adjacent said belt for coating said upper and lower surface; separate sprinklers spaced from said belt for sprinkling said upper and lower surfaces after being coated; suctioning elements adjacent said belt for suctioning up dust from said belt; and at least one second coater with a water-cooled roller for coating said strips of backing material or for producing strips without said strips of backing material one of said sprinklers having at least two variable-slope screens for selectively passing coarse and fine sprinkling particles, and baffles and channels for directing said particles.

2. An arrangement as defined in claim 1, wherein said first coater has a replaceable heated doctor.

3. An arrangement as defined in claim 2, wherein said first coater has a heating roller that can be raised and lowered downstream of said doctor.

4. An arrangement as defined in claim 3, wherein said heating roller has an inside surface; a heating pad extending around said inside surface of said heating roller; and a temperature sensor inside said heating roller.

5. An arrangement as defined in claim 1, wherein said first coater has an application box with a flow-control gap for applying a coating, said box having a rear wall and side walls, said side walls being displaceable for varying and adjusting said flow-control gap.

6. An arrangement as defined in claim 5, including threaded spindles for advancing each of said side walls transversely, said rear wall comprising two transverse walls telescoping together, each one of said transverse walls being fastened to one of said side walls.

7. An arrangement as defined in claim 5, including electric elements in said rear wall for heating said application box in said first coater.

8. An arrangement as defined in claim 1, wherein said first coater has a bottom with a member comprised of low-friction plastic.

9. An arrangement as defined in claim 1, wherein said first coater can be raised and lowered.

10. An arrangement as defined in claim 1, wherein said second coater has an application box with displaceable side walls for applying a coating, said water-cooled roller being raisable and lowerable.

11. An arrangement as defined in claim 1, wherein said water-cooled belt comprises a first water-cooled belt; and a second water-cooled belt downstream of said first water-cooled belt.

12. An arrangement as defined in claim 11, including a deflection roller between said first water-cooled belt and said second water-cooled belt, said deflection roller having a cold-water bath that can be raised and lowered.

13. An arrangement as defined in claim 11, wherein said second water-cooled belt has nozzle means for supplying additional water to cool a coating outside said second water-cooled belt; and downstream hoods with fans for extracting steam adjacent said second water-cooled belt.

14. An arrangement as defined in claim 1, including a plurality of water-cooled rollers downstream of said water-cooled belt.

15. An arrangement as defined in claim 1, including a plurality of arms for suspending said water-cooled belt.

16. An arrangement as defined in claim 1, including an edge sprinkler with vacuum means in addition to said separate sprinklers.

17. An arrangement as defined in claim 1, including backing rollers below said first coater.

18. An arrangement as defined in claim 1, including spray means for applying a release agent to a surface of said belt; and coolant-application means for cooling said belt.

19. An arrangement as defined in claim 1, including a plurality of rubberized compression rollers on said belt and spaced from said first coater for forcing sprinkles into a surface of said material to be coated.

20. An arrangement as defined in claim 1, including unrolling elements for coating materials.

21. An arrangement as defined in claim 1, wherein said first coater is shiftable transversely.

22. An arrangement as defined in claim 21, including transverse rail means, said first coater resting on said transverse rail means.

23. An arrangement as defined in claim 1, wherein said water-cooled roller comprises a double-walled roller with an outer surface that is sufficiently thin and an inner wall that is sufficiently thick to withstand stress in said water-cooled roller, said inner wall and said outer surface having a space therebetween with sections for conducting cooling water.

24. An arrangement as defined in claim 1, including a supporting surface with heating elements below said first coater.

25. An arrangement as defined in claim 1, wherein said material to be coated has edges; and sensor means for sensing said edges and monitoring positions of said edges.

26. An arrangement as defined in claim 1, including scraping means below said material to be coated for scraping off and smoothing out excess applied coating.

27. An arrangement as defined in claim 26, including a collecting tub adjacent said first coater; and a connecting line for excess coating between said collecting tub and said first coater.

* * * * *